US009854032B2

United States Patent
Liu et al.

(10) Patent No.: US 9,854,032 B2
(45) Date of Patent: Dec. 26, 2017

(54) CONTEXT-AWARE TASK OFFLOADING AMONG MULTIPLE DEVICES

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/089,848

(22) Filed: Apr. 4, 2016

(65) Prior Publication Data

US 2017/0230446 A1 Aug. 10, 2017

Related U.S. Application Data

(63) Continuation of application No. 15/017,399, filed on Feb. 5, 2016.

(51) Int. Cl.
  *G06F 15/16* (2006.01)
  *H04L 29/08* (2006.01)
(52) U.S. Cl.
  CPC .................. *H04L 67/10* (2013.01)
(58) Field of Classification Search
  CPC ....................................................... H04L 67/10
  (Continued)

(56) References Cited

U.S. PATENT DOCUMENTS 4,796,255 A * 1/1989 Westbrook ............ H04L 5/1492
  370/294
5,930,823 A * 7/1999 Ito ........................ G06F 9/4405
  700/5

(Continued)

FOREIGN PATENT DOCUMENTS

WO 2013133533 A1 9/2013
WO 2013153260 A1 10/2013

OTHER PUBLICATIONS

S. Mahmoodi et al., "Cloud Offloading for Multi-Radio Enabled Mobile Devices", IEEE International Conference on Communication, Jun. 2015, 6 pages. <http://web.stevens.edu/ses/documents/fileadmin/documents/pdf/sem-kps-vs-15.pdf>.

(Continued)

*Primary Examiner* — Alicia Baturay
(74) *Attorney, Agent, or Firm* — Patterson + Sheridan, LLP

(57) ABSTRACT

The present disclosure relates to offloading computing tasks from a user device to a cloud service. In one embodiment, a method generally includes generating, based on user input, a command for processing by the cloud service. The user device ranks the user device and one or more peer devices in a network based on at least one of information about the user device and one or more peer devices and information about the generated command from the user device and the peer devices, and the user device selects one or more of the user device and the peer devices to transmit the command based on the ranking information. Upon determining that the user device is one of the selected devices, the user device transmits the command to the cloud service. If the user device is not one of the selected devices, the user device discards the generated command.

8 Claims, 5 Drawing Sheets

(58) Field of Classification Search
USPC ........................................................ 709/217
See application file for complete search history.

(56) References Cited

U.S. PATENT DOCUMENTS

| | | | |
|---|---|---|---|
| 6,219,645 B1* | 4/2001 | Byers ..................... G10L 15/02 381/91 |
| 6,477,117 B1* | 11/2002 | Narayanaswami .. G04G 13/026 368/224 |
| 6,535,854 B2 | 3/2003 | Buchner et al. |
| 6,721,705 B2 | 4/2004 | Kurganov et al. |
| 7,081,905 B1* | 7/2006 | Raghunath ............... G04G 5/00 345/684 |
| 7,146,492 B2 | 12/2006 | Bolt ...................... G06F 3/0626 713/1 |
| 7,613,841 B2* | 11/2009 | Asano ..................... G06F 13/42 710/110 |
| 7,839,269 B2* | 11/2010 | Steger ................ A63B 71/0686 340/407.1 |
| 8,031,172 B2* | 10/2011 | Kruse ..................... G06F 3/014 345/156 |
| 8,093,995 B2* | 1/2012 | Steger ................ A63B 71/0686 340/407.1 |
| 8,271,287 B1 | 9/2012 | Kermani |
| 8,340,975 B1 | 12/2012 | Rosenberger |
| 8,378,795 B2* | 2/2013 | Steger ................ A63B 71/0686 340/407.1 |
| 8,553,625 B2 | 10/2013 | Shao et al. |
| 8,601,518 B1* | 12/2013 | Wen ................. H04N 21/41422 725/62 |
| 8,713,119 B2* | 4/2014 | Lindahl ................... G10L 15/30 379/93.24 |
| 8,812,325 B2 | 8/2014 | Burns et al. |
| 8,819,170 B2* | 8/2014 | Cohen ................... H04L 67/125 709/217 |
| 8,924,219 B1 | 12/2014 | Bringert et al. |
| 9,024,257 B2* | 5/2015 | Omino ..................... G01T 1/02 250/336.1 |
| 9,239,740 B2* | 1/2016 | Zhao ..................... G06F 9/5044 |
| 9,363,725 B2* | 6/2016 | Patel ...................... H04W 36/14 |
| 9,411,612 B2* | 8/2016 | Balakrishnan ...... G06F 9/44505 |
| 9,454,898 B2* | 9/2016 | Kim ....................... G08C 17/02 |
| 2003/0120486 A1 | 6/2003 | Brittan et al. |
| 2003/0236099 A1 | 12/2003 | Deisher et al. |
| 2004/0153319 A1 | 8/2004 | Yacoub |
| 2005/0080800 A1 | 4/2005 | Parupudi et al. |
| 2008/0066183 A1* | 3/2008 | George ................... G06F 21/74 726/27 |
| 2008/0242288 A1 | 10/2008 | Guyette |
| 2008/0243513 A1 | 10/2008 | Bucchieri et al. |
| 2009/0243959 A1 | 10/2009 | Pering et al. |
| 2009/0249029 A1* | 10/2009 | Liu ........................ G06K 15/02 712/28 |
| 2010/0250677 A1 | 9/2010 | Kahan et al. |
| 2011/0145417 A1* | 6/2011 | Tamura ................... H04L 67/14 709/227 |
| 2013/0053148 A1 | 2/2013 | Nelson et al. |
| 2013/0325994 A1* | 12/2013 | Chai ................... H04L 67/1097 709/208 |
| 2014/0033269 A1 | 1/2014 | Poornachandran et al. |
| 2014/0040445 A1* | 2/2014 | Beckert ............... H04L 67/2823 709/223 |
| 2014/0171064 A1 | 6/2014 | Das |
| 2014/0218184 A1* | 8/2014 | Grant ...................... G08B 6/00 340/407.1 |
| 2014/0241540 A1* | 8/2014 | Hodges ................ H04R 1/1091 381/74 |
| 2014/0244271 A1 | 8/2014 | Lindahl |
| 2014/0278438 A1* | 9/2014 | Hart ........................ G06F 3/167 704/275 |
| 2014/0280990 A1* | 9/2014 | Dove ................... H04L 65/601 709/228 |
| 2014/0348327 A1* | 11/2014 | Linde ..................... H04W 4/008 381/2 |
| 2015/0161253 A1* | 6/2015 | Shah .................... G06F 17/2247 715/234 |
| 2015/0215350 A1 | 7/2015 | Slayton et al. |
| 2015/0286813 A1* | 10/2015 | Jakobsson ............... G06F 21/35 726/9 |
| 2015/0288629 A1* | 10/2015 | Choi ...................... H04L 51/32 709/206 |
| 2015/0289217 A1* | 10/2015 | Ban ..................... H04W 56/001 455/41.2 |
| 2015/0289308 A1* | 10/2015 | Kang .................... H04W 4/008 455/41.2 |
| 2015/0301574 A1* | 10/2015 | Kim ........................ G06F 1/163 345/156 |
| 2015/0358767 A1* | 12/2015 | Luna ..................... G01S 5/0263 455/456.1 |
| 2015/0358768 A1* | 12/2015 | Luna ....................... H04W 4/02 455/456.1 |
| 2016/0013980 A1* | 1/2016 | Mcknight ............ H04L 41/0813 709/221 |
| 2016/0049147 A1* | 2/2016 | Anderson ............... G10L 25/60 704/275 |
| 2016/0080941 A1* | 3/2016 | Jakobsson ............... G06F 21/35 726/7 |
| 2016/0157087 A1* | 6/2016 | Lee ......................... H04W 8/12 370/329 |
| 2016/0179066 A1* | 6/2016 | Chadwick ............... G06F 1/163 700/83 |
| 2016/0179462 A1* | 6/2016 | Bjorkengren ........... G06F 3/167 704/275 |
| 2016/0335263 A1* | 11/2016 | Yin .................... G06F 17/30867 |
| 2016/0358471 A1* | 12/2016 | Hajj ..................... G01C 21/3423 |
| 2016/0359666 A1* | 12/2016 | Ledwith .................. H04L 67/06 |

OTHER PUBLICATIONS

K. Sinha et al., "Techniques for fine-grained, multi-site computation offloading", in Cluster, Cloud and Grid Computing (CCGrid), 2011 11th IEEE/ACM International Symposium on, 2011, pp. 184-194. <https://engineering.purdue.edu/~milind/docs/ccgrid11.pdf>.
E. Cuervo et al., "Maui: Making Smartphones Last Longer with Code Offload", MobiSys'10, Jun. 15-18, 2010, San Francisco, California, USA, 14 pages.
M. Ra et al., "Odessa: Enabling Interactive Perception Applications on Mobile Devices", MobiSys'11, Jun. 28-Jul. 1, 2011, Bethesda, Maryland, USA, 14 pages.
L. Xiang et al., "Ready, Set, Go: Coalesced Offloading from Mobile Devices to the Cloud", IEEE Infocom 2014, IEEE Conference on Computer Communications, pp. 2373-2381. <http://iqua.ece.toronto.edu/papers/lxiang-infocom14.pdf>.
I. Zhang et al., "Customizable and Extensible Deployment for Mobile/Cloud Applications", 11th USENIX Symposium on Operating Systems Design and Implementation, Oct. 6-8, 2014, 17 pages. <https://www.usenix.org/system/files/conference/osdi14/osdi14-paper-zhang.pdf>.
C. Shi et al., "COSMOS: Computation Offloading as a Service for Mobile Devices", MobiHoc'14, Aug. 11-14, 2014, Philadelphia, PA, USA, 10 pages. <http://www.cc.gatech.edu/~khabak3/papers/COSMOS-MobiHoc'14.pdf>.
H. La et al., "A Conceptual Framework for Provisioning Context-aware Mobile Cloud Services", 2010 IEEE 3rd International Conference on Cloud Computing, 8 pages. <http://www.academicroom.com/article/conceptual-framework-provisioning-context-aware-mobile-cloud-services>.
Matti Kemppainen "Mobile Computation Offloading: a Context-driven Approach", Aalto University T-110.5190 Seminar on Internetworking, Spring 2011, 10 pages. <http://www.cse.tkk.fi/fi/opinnot/T-110.5121/2013/lisatty-files/T-110_5121_mobile_computation_offloading_a_context-driven.pdf>.
C. Mavromoustakis et al., "Context-oriented opportunistic cloud offload processing for energy conservation in wireless devices", 2014 IEEE Globecom Workshops, Dec. 8-12, 2014, Austin, TX, USA, pp. 24-30 [Abstract only].

(56) References Cited

OTHER PUBLICATIONS

Kevin Spain, "The Next Billion-Dollar Market Opportunity is Mobile Enterprise", Mar. 30, 2015, TechCrunch.com, 12 pages. <http://techcrunch.com/2015/03/30/the-next-billion-dollar-market-opportunity-is-mobile-enterprise/>.

Cisco, "Cisco Visual Networking Index: Global Mobile Data Traffic Forecast Update, 2015-2020", White Paper, Feb. 3, 2016, 39 pages. <http://www.cisco.com/c/en/us/solutions/collateral/service-provider/visual-networking-index-vni/mobile-white-paper-c11-520862.html>.

Statista The Statistics Portal, "Number of connected devices used per person in selected countries 2014", retrieved , Apr. 27, 2016, 4 pages. <http://www.statista.com/statistics/333861/connected-devices-per-person-in-selected-countries/>.

U.S. Appl. No. 15/017,423, Entitled "Context-Aware Task Processing for Multiple Devices", filed Feb. 5, 2016.

U.S. Appl. No. 15/141,445, Entitled "Context-Aware Task Processing for Multiple Devices", filed Apr. 28, 2016.

U.S. Appl. No. 15/017,399, Entitled "Context-Aware Task Offloading Among Multiple Devices", filed Feb. 5, 2016.

\* cited by examiner

CONTEXT-AWARE TASK OFFLOADING AMONG MULTIPLE DEVICES

CROSS-REFERENCE TO RELATED APPLICATIONS

This application is a continuation of co-pending U.S. patent application Ser. No. 15/017,399, filed Feb. 5, 2016. The aforementioned related patent application is herein incorporated by reference in its entirety.

BACKGROUND

The present invention relates to offloading computing tasks from a connected device (e.g., mobile phones, tablets, wearable devices, and so on), and more specifically to selecting a number of devices to transmit commands to a cloud service for processing.

For various reasons, computing systems may offload computational tasks for processing on a cloud service, or a remote system (or cluster of systems) that provides computational services to requesting user devices. Typically, tasks offloaded to a remote system are computationally expensive (e.g., parsing a vocal input for an executable command or a query, facial/image recognition, authentication, and so on) and may need connectivity to multiple information sources. Offloading such tasks from a client system to a cloud service may reduce power usage at the client system, increase battery life for mobile user devices, and provide for higher performance by performing tasks on a system with greater processing capabilities.

In a typical device environment, multiple devices may be able to obtain input that can be used to generate a command to be offloaded to a cloud system. For example, a tablet, smartphone, and a wearable device (e.g., a smartwatch) that are collocated with each other may each be able to obtain voice input to be processed by a cloud service. Some devices may be connected to a cloud service through an external network connection, while other devices may only be able to transmit a command through another device with an external network condition.

In some cases, devices may activate when a user says a predetermined command (e.g., "Hey Siri"). A number of collocated devices can activate when the user says the predetermined command and generate a query for processing by the cloud service. However, not all of the collocated devices may need to process the query and offload the query to the cloud service.

Users often have multiple devices that can transmit a command to be offloaded to a cloud service. Each device generally has its own display and feedback capabilities (e.g., haptic feedback, audio feedback, and so on). Additionally, each device may have a different form factor that can perform certain tasks (e.g., notifying a user) for a given context, which may be determined from sensor data, imaging devices, and/or other information gathered at the device. For example, a tablet may be suited for displaying video to a user, while a wearable device may be suited for providing haptic feedback to a user.

Generally, multiple user devices can associate with the same local network to allow for coordination of services across the multiple devices. In some cases, some devices may not be able to connect to an external network itself, but may use a bridge (e.g., a cellular phone or cellular data-enabled tablet) to connect to an external network. These devices can offload commands to a cloud service by transmitting the command to the bridge device, which then transmits the command to the cloud service.

Cloud services typically receive a command from a user device with data identifying the user device or a group of user devices that are the source of the command. After the cloud service finishes processing the command and generates a response, the cloud service can either send the response to the specific requesting device or the group of devices.

SUMMARY

One embodiment disclosed herein includes a method for selecting one or more devices in a network to transmit a command to a cloud service. The method generally includes generating, based on user input, a command for processing by the cloud service. The user device ranks the user device and one or more peer devices in a network based on at least one of information about the user device and one or more peer devices and information about the generated command from the user device and the one or more peer devices, and the user device selects one or more of the user device and the peer devices to transmit the command based on the ranking information. Upon determining that the user device is one of the selected devices, the user device transmits the command to the cloud service. If the user device is not one of the selected devices, the user device discards the generated command.

Another embodiment includes a computer-readable storage medium having instructions, which, when executed on a processor, performs an operation for selecting one or more devices in a network to transmit a command to a cloud service. The operations generally include generating, based on user input, a command for processing by the cloud service. The user device ranks the user device and one or more peer devices in a network based on at least one of information about the user device and one or more peer devices and information about the generated command from the user device and the one or more peer devices, and the user device selects one or more of the user device and the peer devices to transmit the command based on the ranking information. Upon determining that the user device is one of the selected devices, the user device transmits the command to the cloud service. If the user device is not one of the selected devices, the user device discards the generated command.

Still another embodiment includes a processor and a memory storing a program, which, when executed on the processor, performs an operation for selecting one or more devices in a network to transmit a command to a cloud service. The operations generally include generating, based on user input, a command for processing by the cloud service. The user device ranks the user device and one or more peer devices in a network based on at least one of information about the user device and one or more peer devices and information about the generated command from the user device and the one or more peer devices, and the user device selects one or more of the user device and the peer devices to transmit the command based on the ranking information. Upon determining that the user device is one of the selected devices, the user device transmits the command to the cloud service. If the user device is not one of the selected devices, the user device discards the generated command.

DETAILED DESCRIPTION

Embodiments presented herein describe techniques for selecting one or more devices in a network to offload commands to a cloud service for processing based on context information associated with each device. By using context information for a device to select one or more devices to transmit a command to a cloud service, a group of devices can transmit commands from, for example, a device with the highest audio quality, a device the user is actively using or focused on, and so on. Additionally, by selecting a subset of user devices to transmit commands to a cloud service, the devices can reduce traffic loads on a local network and the number of redundant requests to be processed by the cloud service.

Figure 1:
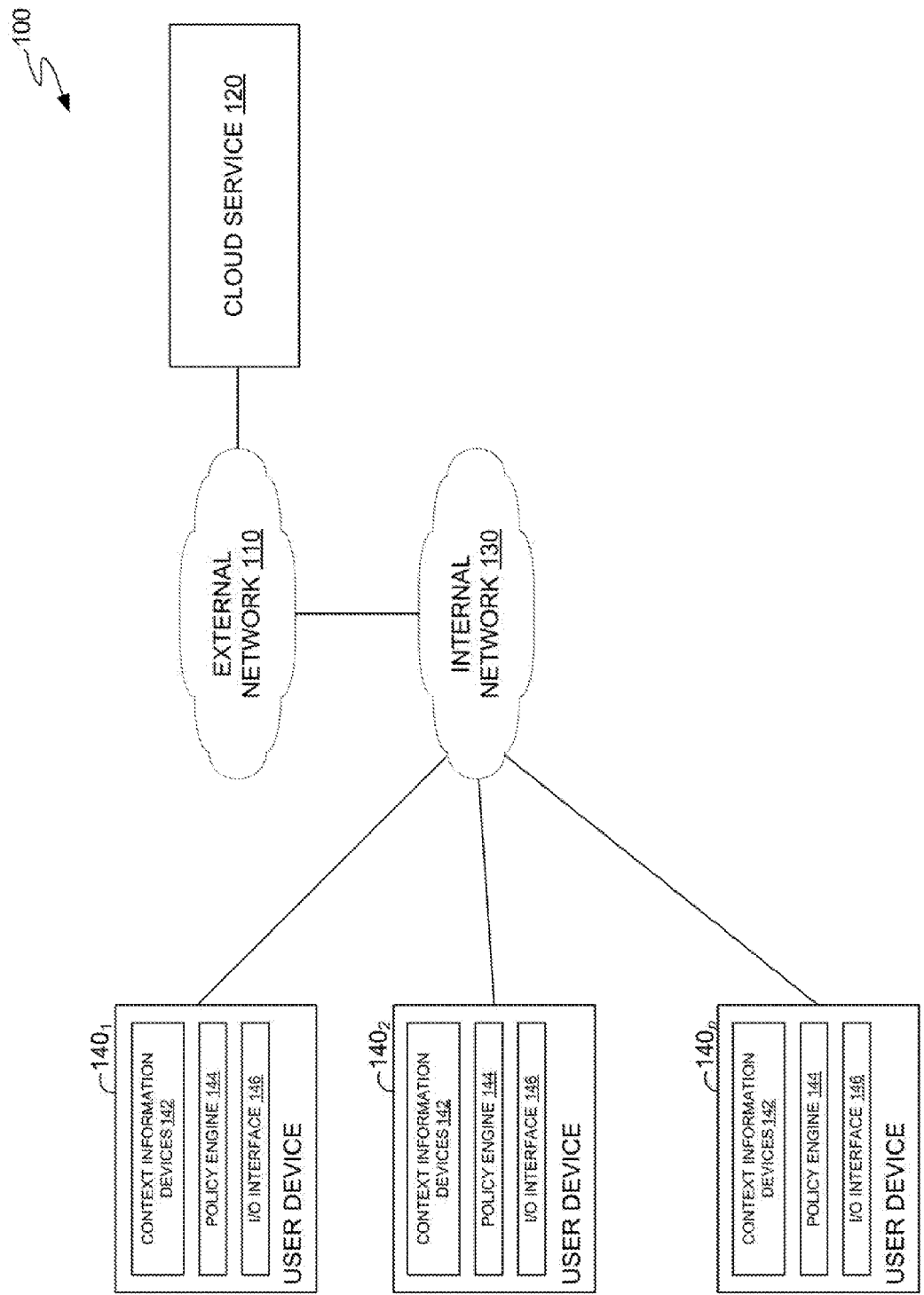
FIG. 1 illustrates an example computing system in which commands are offloaded from a user device to a cloud service, according to one embodiment.

FIG. 1 illustrates an example computing environment in which peer devices in a local network selectively offload commands to a cloud service, according to an embodiment. As illustrated, the computing environment includes a cloud service 120 and a plurality of user devices 140. The plurality of user devices 140 are connected to internal network 130, and cloud service 120 and internal network 130 are connected to an external network 110.

Cloud service 120 generally receives user commands from one or more user devices 140 for processing and provides a response to the one or more user devices 140. Cloud service 120 may be implemented as a distributed system in which multiple computing systems cooperate to parse a received command and generate a response. For example, cloud service 120 may receive an audio file (e.g., a WAV file) from a user device 140, perform voice recognition on the audio file to obtain a parseable string, and generate a query for further processing from the parseable string.

Based on the query, cloud service 120 can direct the query to execute on one or more other services. For example, cloud service 120 can search the web generally in response to a query asking "what is the meaning of life, the universe, and everything?" In contrast, cloud service 120 can direct more specialized queries to specialized search engines. For example, cloud service 120 may search a set of food websites in response to a query for a recipe for spaghetti carbonara, a set of travel web sites in response to a query for airline ticket prices to a given destination, a set of exercise websites in response to a query for a demonstration of a particular yoga pose, a personal organizer service in response to a query for events scheduled on a user's calendar for a given day, and so on. Upon receiving or generating a response, cloud service 120 can transmit the response to one or more user devices 140 for presentation to a user.

User devices 140 are generally user-controlled devices that can generate one or more commands (e.g., in voice files) and offload the commands for processing by cloud service 120. As illustrated, user devices 140 generally include one or more context information devices 142, policy engine 144, and I/O interface 146. In some cases, user devices 140 may each be connected to the same network; in other cases, some user devices 140 (e.g., smartwatches) may not have its own network adapter for connecting to internal network 130 and thus may depend on another user device (e.g., a mobile phone) for access to the external network 110 (and correspondingly, access to cloud service 120) via internal network 130.

User devices 140 may have a variety of form factors, and, as discussed above, each user device 140 may be an optimal device for offloading certain tasks and receiving feedback from a cloud service 120 in certain contexts. For example, a wearable device that provides haptic feedback may be a good device to use for indicating, during exercise, when a user should transition from one portion of a workout to another portion of the workout, but may not be a good device to use for displaying instructional videos for the workout. In another example, a tablet or phone may be a good device to use for displaying instructional videos for the workout, but may not be as effective in informing a user when to transition to different portions of a workout.

Context information devices 142 generally provide information about the context of a user device 140. For example, the context information devices 142 can provide information about remaining battery life, charging state (e.g., discharging, charging from a secondary battery, or charging from mains power), whether the device is moving (e.g., through accelerometers and/or gyroscopes), and so on. In some cases, context information devices 142 may additionally include user-facing cameras, which user device 140 can use to determine if a user is looking at the device when the device records a command to offload to cloud service 120 for processing. Context information devices 142 may also provide, for example, audio quality metrics that user device 140 can use to determine if an audio sample obtained at user device 140 is of sufficient quality (e.g., sufficient volume with distortion or clipping below a threshold value) to be transmitted to cloud service 120 for additional processing.

Policy engine 144 generally processes information from context information devices 142 at the user device 140 and peer user devices 140 to determine which user devices in internal network 130 are to transmit a command to cloud service 120. Policy engine 144 can select a number of user devices to transmit commands to cloud service 120, for example, based on a combination of values from the one or more context information devices 142 present on each user device 140. For example, policy engine 144 can generate a score for each of the user devices 140 in internal network 130 to determine which user devices 140 can transmit a command to cloud service 120. To calculate the score, policy engine 144 can apply a weighting to the values obtained from each of the context information devices 142 (e.g., via an application programming interface (API) that exposes data from each of the context information devices 142 to policy engine 144) associated with a user device 140. For example, policy engine 144 may assign a high weighting to remaining battery life and whether or not a user device is connected to mains power, while assigning a lesser weighting to signal strength (e.g., in a wireless local area network where user devices 120 are connected to the same access point). Additionally, policy engine 144 can use data from devices such as accelerometers, gyroscopes, GPS data, and so on to determine if a particular device is a suitable candidate for offloading a command to a cloud service 120. For example, accelerometers in a wearable device may indicate when a user has raised the user's arm to use the wearable device, and thus may additionally indicate that a user is speaking into a microphone incorporated into the wearable device. In another case, GPS data can indicate that a user is driving, and thus may indicate that a watch would not be a suitable candidate for offloading commands to or presenting data from a cloud service 120.

In some cases, policy engine 144 at a local user device 140 may use data from the local user device 140 and peer user devices 140 to select a master device in local network 130. The designated master device in local network 130 may be the sole device in local network 130 that transmits commands to cloud service 120 for processing. For example, policy engine 144 may request network connectivity data (e.g., signal strength, access to external networks, bandwidth, and so on) and power information (e.g., remaining battery life, charging status, and so on) from each of the user devices 140. Upon selecting a master device (e.g., a device with high signal strength and bandwidth that draws power from electrical mains), each of the user devices 140 receive information indicating that the user devices 140 are to transmit commands to the designated master device to be offloaded to cloud service 120.

In some cases, the designated master device may periodically request context information from each of the user devices 140 in local network 130. Using the context information, the master device can determine how to partition a response from cloud service 120 into one or more portions to be output on different user devices 140. For example, the designated master device could partition a guided workout video into three portions: a video portion, an audio portion, and a haptic portion. The master device can use the context information provided from each of the user devices to determine which device(s) a user is looking at, which device(s) are connected to an audio output device (e.g., headphones), and, if present, whether a user is wearing a device that provides haptic feedback. Subsequently, the master device can transmit the video portion to a first device (e.g., a tablet), the audio portion to a second device (e.g., a smartphone connected to a pair of headphones), and the haptic portion to a third device (e.g., a wearable device). In some cases, the master device can transmit the same portion to multiple devices, which may allow multiple devices to present the same data to a user.

I/O interface 146 generally allows a user device 140 to transmit commands to a cloud service 120 (e.g., through a designated master device), receive response from cloud service 120, and inform peer user devices 140 in internal network 130 of device capabilities and contextual information that can be used to select one or more devices to transmit and receive data from cloud service 120, as discussed above. In an example, a first I/O interface 146 (e.g., a Bluetooth interface) can be used to share device capabilities and contextual information between user devices 140. A second I/O interface 146 (e.g., a Wi-Fi interface) can be used to transmit commands from user devices 140 to a designated master device and/or cloud service 120.

Figure 2:
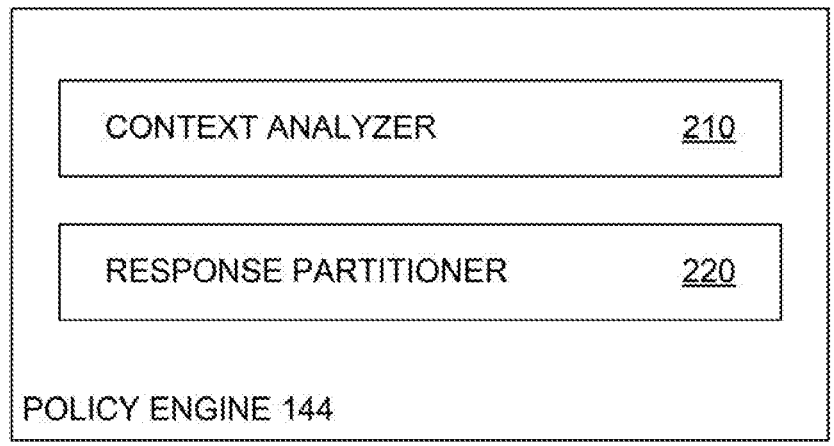
FIG. 2 illustrates an example policy engine for selecting one or more devices to offload a command to a cloud service for processing, according to one embodiment.

FIG. 2 illustrates a block diagram of an example policy engine 144, according to one embodiment. As illustrated, policy engine 144 includes a context analyzer 210 and a response partitioner 220.

Context analyzer 210, as discussed above, generally receives information from one or more user devices 140 to select one or more devices to transmit commands to a cloud service 120 for further processing. In one embodiment, context analyzer 210 can receive an initial report from each user device 140 when the user device 140 connects to internal network 130. The initial report may include, for example, absolute values for battery life and signal strength and information indicating one or more device capabilities (e.g., audio recording, visual monitoring, haptic feedback, and so on). Over time, as conditions and the context of a peer user device 140 change, the peer user device 140 updates context analyzer 210 to reflect the updated conditions and context at the user device 140. For example, a peer user device can transmit a report to context analyzer 210 indicating changes in remaining battery life and signal strength, as well as changes in state (e.g., that the peer user device has started drawing power from electrical mains, that a user is looking directly at the peer user device, and so on).

Using the contextual data obtained from one or more user devices 140, context analyzer 210, as discussed above, determines which of the one or more user devices 140 are to transmit one or more commands to a cloud service 120 for processing. As discussed above, context analyzer 210 can generate a score based on weighted data points (e.g., available power, signal strength, charging state, contextual information indicating user action(s) with respect to the user device, quality of a recorded audio command, and so on). Context analyzer 210 can subsequently examine the list of scores to determine if the user device 140 on which context analyzer 210 executes is associated with the highest score. If the user device 140 has the highest score of the group of peer user devices, the user device 140 can transmit the command to the cloud service 120. In some cases, the transmitting user device 140 may additionally transmit context information for each of the user devices 140 in internal network 130 to the cloud service 120, which cloud service 120 can, in some cases, use to partition a response into multiple discrete parts.

In one embodiment, as discussed above, context analyzer 210 may additionally select a master device to interface with cloud service 120. For example, a master device may, in one case, have a high signal strength and bandwidth and either a large amount of remaining battery life or be connected to mains power. When context analyzer 210 selects a master device from the group of user devices 140 in internal network 130, context analyzer 210 can instruct each of the user devices 140 to transmit any commands to be processed at cloud service 120 to the designated master device.

In some cases, context analyzer 210 may be used to select or limit output of a response to a subset of the user devices 140 in internal network 130. For example, if satellite positioning system data (e.g., from GPS, GLONASS, Galileo, or similar systems) indicates that a user is driving, context analyzer 210 may exclude certain devices from presenting visual information to a user (e.g., on cellular phones) and transmit visual data to other devices in the network (e.g., a head-mounted display). In another case, context analyzer 210 can limit audio output to devices connected to an automobile media interface or a wireless audio device (e.g., a Bluetooth headset). In some cases, context analyzer 210 can block the user devices 140 in internal network 130 from processing certain types of outputs based on contextual information (e.g., haptic feedback while a user is driving).

Response partitioner 220 is generally configured to receive a response from a cloud service 120 and divide the response into a plurality of discrete parts to be output on one or more user devices 140. In some cases, response partitioner 220 may be a pass-through entity in a designated master device which routes a pre-partitioned response to designated user devices 140 according to information provided from cloud service 120. In another case, response partitioner 220 receives an unpartitioned response from a cloud service and divides the response into a plurality of parts to be routed to different user devices 140. For example, as discussed above, a response could be partitioned into a video portion, an audio portion, and a haptic portion. Response partitioner 220 can use the context information provided to policy engine 144 to select different devices to output the partitioned response. For example, if the context information indicates that a user is looking at a particular user device 140, response partitioner 220 can transmit the video portion of the response to the particular user device for display. Likewise, if an audio output device (e.g., headphones) is connected to another user device 140, the audio portion of the response can be routed to the user device 140 with the connected output device.

As discussed above, context analyzer 210 can limit response output to certain devices based on the context of the devices in internal network 130 (e.g., if a user is driving). Based on restrictions imposed by context analyzer 210 on response output devices, response partitioner 220 can examine the subset of allowable response output devices to select one or more of the allowable output devices to output, to a user, at least a portion of the response.

Figure 3:
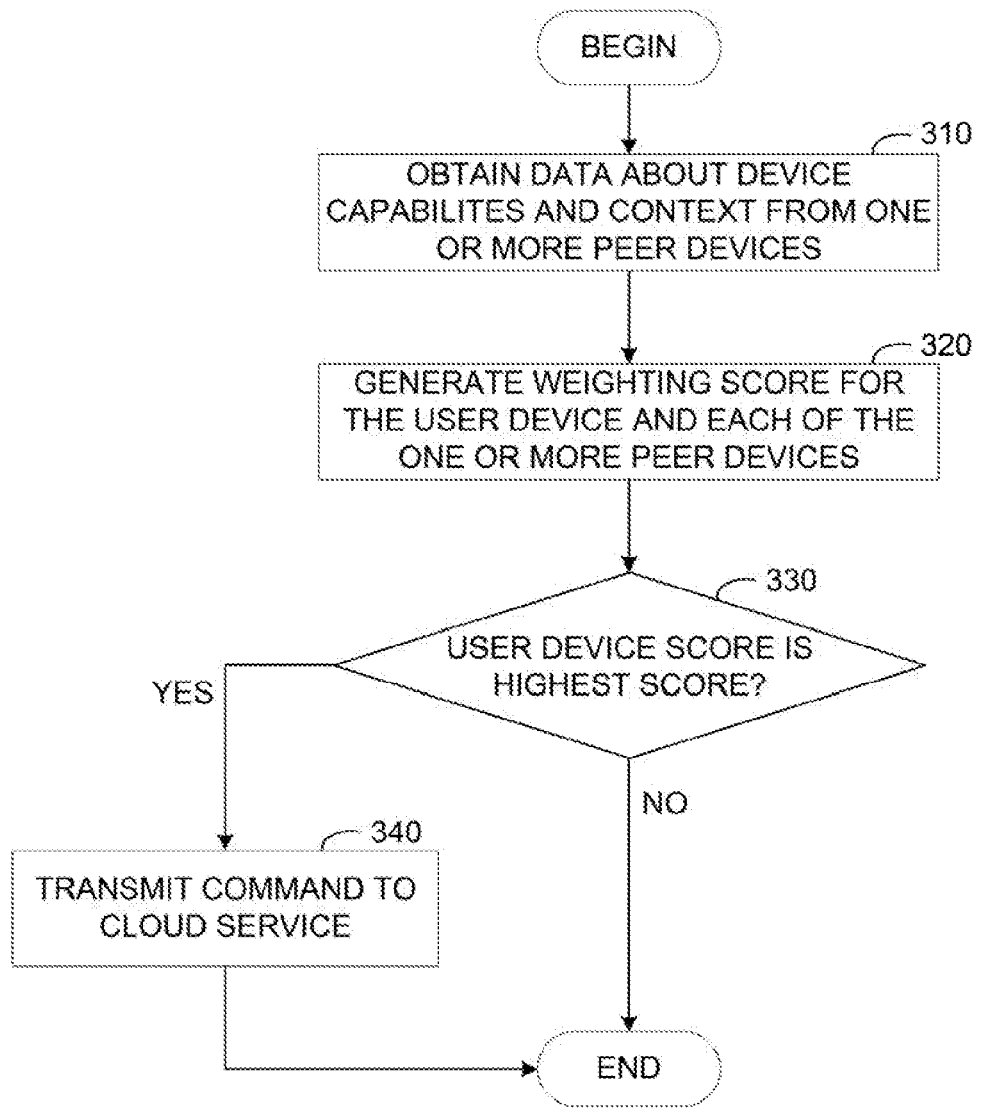
FIG. 3 illustrates example operations that may be performed by a user device to determine whether the device is to offload a command to a cloud service for processing based, at least in part, on context information associated with the device, according to one embodiment.

FIG. 3 illustrates example operations 300 that may be performed by a user device to determine whether to transmit a command to a cloud service, according to one embodiment. As illustrated, operations 300 begin at step 310, where a user device obtains data about device capabilities and context from one or more peer devices. As discussed above, a user device can obtain an initial report from a peer user device when the peer user device connects to the same network. The initial report may include, for example, information about the peer device's remaining battery life, signal strength, charging/discharging state, and device capabilities. As conditions and the context in which the peer device operates change, the peer device can transmit updated capability and context information to the user device, for example, as a difference report that the user device uses to modify locally stored device capability and context information or as a full report that replaces previously stored data.

At step 320, the user device generates a weighting score for the device and each of the one or more peer devices. As discussed above, the weighting score generally indicates which device(s) can generate a command of a sufficient quality (e.g., for a voice command, that the sound level of the voice command is sufficient for the cloud service to parse and that a level of distortion is below a threshold value). In some cases, the user device may additionally generate the weighting score based on, for example, device metrics (e.g., power level, signal strength, and so on) and user activity detected by one or more sensors (e.g., accelerometer data indicating that a user is actively handling the device, location information data indicating that the user is driving, and so on).

At step 330, the user device examines the scores for the device and each of the one or more peer devices to determine whether the score for the user device is the highest score among the group of devices. If so, at step 340, the user device transmits the command to the cloud service. Otherwise, operations 300 end.

Figure 4:
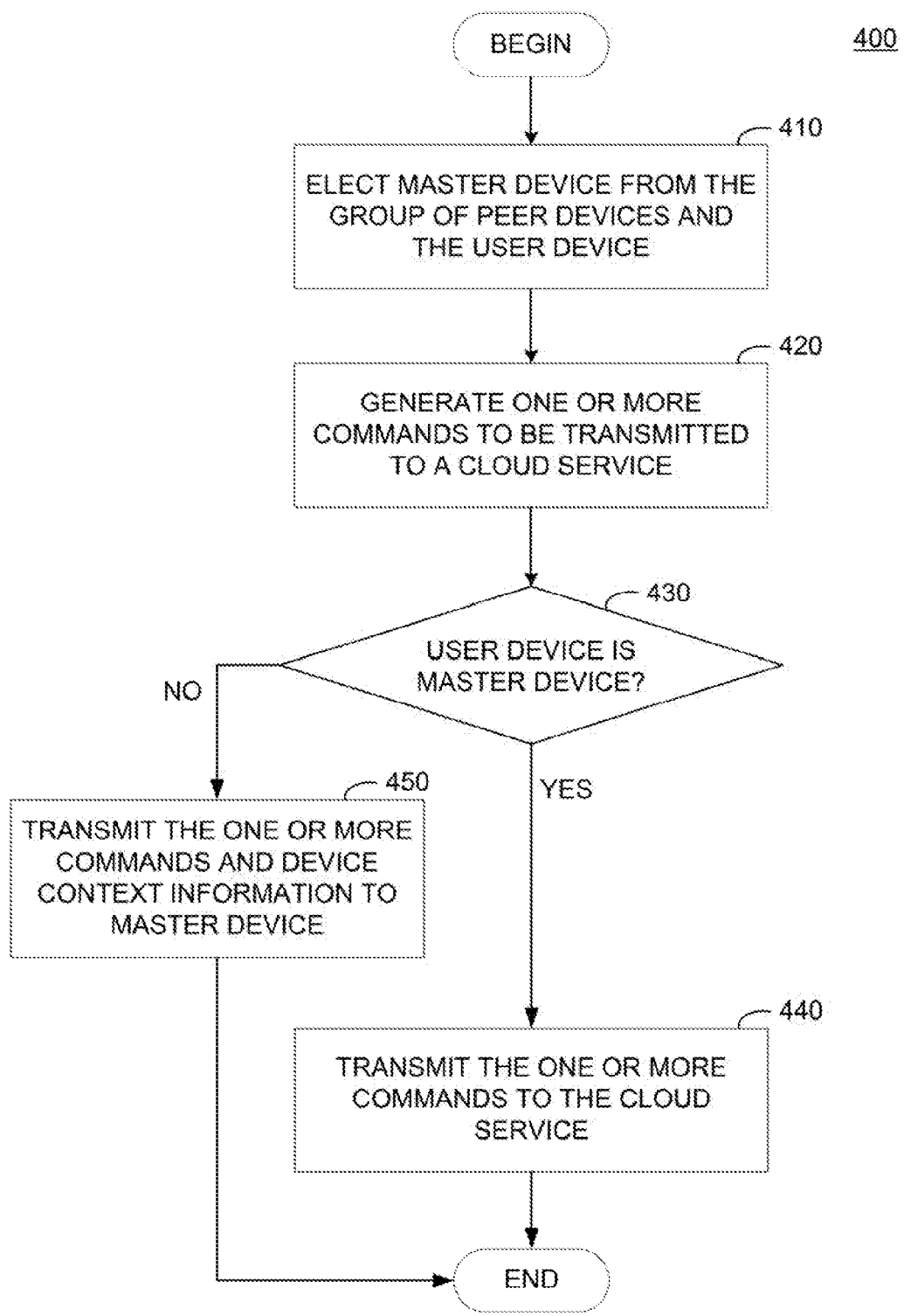
FIG. 4 illustrates example operations that may be performed by a user device to offload a command to a cloud service for processing through a designated master device, according to one embodiment.

FIG. 4 illustrates example operations 400 that may be performed by a user device to transmit a command to a cloud service via a designated master device, according to one embodiment. As illustrated, operations 400 begin at step 410, where the user device elects a master device from the group of peer devices and the user device (e.g., the devices connected to internal network 130). As discussed above, the user device can elect a master device in a network based on, for example, power level and signal strength information.

At step 420, the user device generates one or more commands to be transmitted to a cloud service. In some cases, the command may be an audio or video file that the cloud service can parse to generate a textual command that can be further processed to generate a result. In some cases, the command may include contextual information that the master device and/or cloud service can use to determine which command to transmit to the cloud service and which devices are to output a portion of the response to a user.

At step 430, the user device determines if the user device is the designated master device. If so, at step 440, the user device transmits the generated command to the cloud service. In some cases, the user device can additionally transmit capability and context information for the device and the peer devices to the cloud service, which, as discussed above, the cloud service can use to partition a response into a plurality of discrete portions for output by a plurality of the devices in internal network 130. In some cases, for example, the designated master device may not be selected to offload a command to the cloud service. In such a case, the designated master device can generate a command to be offloaded to the cloud service. Another user device (selected for offloading based on, for example, signal strength) can receive the generated command from the master device and instructions to offload generated command to the cloud service.

Otherwise, the user device is not the designated master device, and at step 450, the user device transmits the generated command and device context information to the master device. In some cases, the user device can use the weighting scores discussed above to determine whether or not to transmit a generated command to the master device. For example, if the weighting score indicates that the user device generates or has a high likelihood of generating poor quality output (e.g., a distorted audio stream), the user device need not transmit the generated command to the master device.

Figure 5:
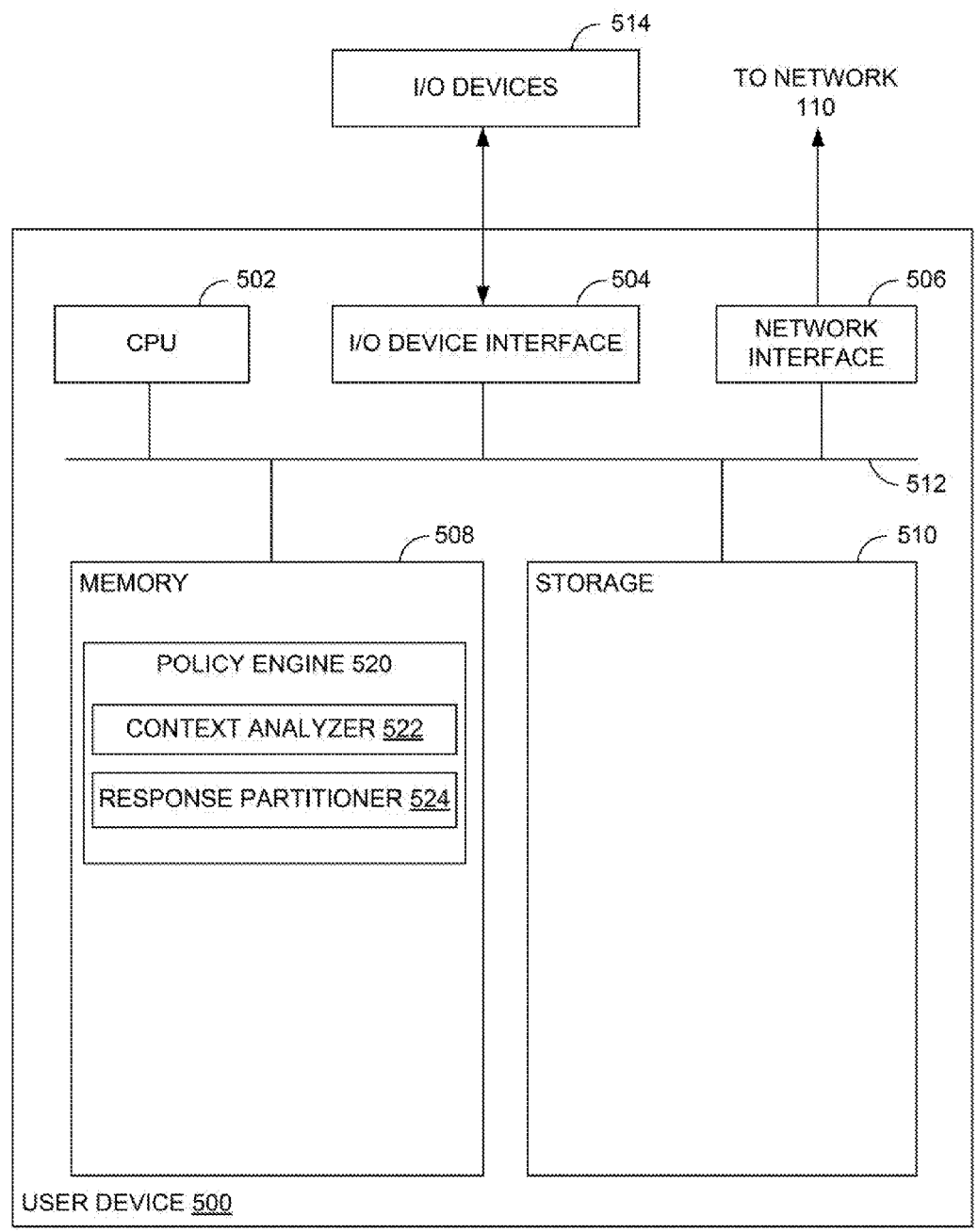
FIG. 5 illustrates an example system in which context information is used to determine whether the system offload commands to a cloud service for processing, according to one embodiment.

FIG. 5 illustrates an example user device 500 that cooperates with other peer devices (e.g., connected to the same network) to select one or more device to offload a command for processing by a cloud service, according to an embodiment. As shown, the server includes, without limitation, a central processing unit 502, one or more I/O device interfaces 504, which may allow for the connection of various I/O devices 514 (e.g., keyboards, displays, mouse devices, pen input, etc.) to the computing system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage

510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a policy engine 520. Policy engine 520, as discussed above, is generally configured to examine device capability and context information from one or more peer devices and the user device to select one or more devices to transmit commands to a cloud service for processing. Context analyzer 522, as discussed above, generally calculates weighting scores for user device 500 and peer devices in the network. Context analyzer 522 may generate the weighting scores, for example, based on device state and information obtained from one or more sensors indicating that a user is actively manipulating a device. Based on the calculated weighting scores, context analyzer 522 can determine whether or not user device 500 can transmit commands (e.g., voice files) to a cloud service for further processing.

In some cases, as discussed above, context analyzer 522 may additionally select a master device from the user device 500 and the one or more peer devices to serve as the sole point of contact in a network with a cloud service. Context analyzer 522 can select the master device based on, for example, information about remaining battery life at a device, whether the device is drawing power from a battery or mains power, signal strength, and so on. When context analyzer 522 selects a master device, context analyzer 522 can generate a message identifying the master device and transmit the message to each of the peer devices in the network (e.g., via network interface 506).

Response partitioner 524, as discussed above, generally receives a response to a command from a cloud service and can use information about peer device capabilities and context to divide the response into a plurality of discrete portions to be output by different devices in the network. In some cases, response partitioner can use the device weightings calculated by context analyzer 522 to determine which devices in the network are suitable devices for outputting different types of data to a user (e.g., audio, visual, and/or haptic feedback). After partitioning a response into a plurality of portions, response partitioner can transmit different portions of the response to the appropriate device (e.g., transmitting a visual portion of the response to a tablet or monitor that a user is looking at, an audio portion of the response to a device with a connected audio output device, a haptic portion of the response to a wearable device, and so on).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for a user device to offload computing tasks to a cloud service, the method comprising:
    generating, based on user input, a command for processing by the cloud service;
    based on at least one of information about the user device and one or more peer devices and information about the generated command from the user device and the one or more peer devices, ranking the user device and the one or more peer devices, wherein the ranking comprises generating a score for each of the user device and the one or more peer devices based on a weighting of one or more characteristics of the user device and the one or more peer devices;
    selecting one or more of the user device and the peer devices to transmit the command to the cloud service for processing based on the ranking information;
    upon determining that the user device is one of the selected devices, transmitting the command to the cloud service; and
    upon determining that the user device is not one of the selected devices, discarding the generated command.

2. The method of claim 1, wherein the selecting one or more of the user device and the one or more peer devices comprises designating a master device to communicate with the cloud service.

3. The method of claim 2, further comprising:
    upon determining that the user device is not the master device:
        transmitting the command to the master device; or
        transmitting the command to a selected device other than the master device for offloading to the cloud service.

4. The method of claim 1, further comprising:
    receiving a response from the cloud service.

5. The method of claim 4, further comprising:
    based on partitioning information in the response, outputting at least a portion of the response on the user device.

6. The method of claim 4, further comprising:
    partitioning the response into a plurality of discrete parts; and
    based on the information about the user device and the one or more peer devices, selecting one or more of the parts to output on the user device.

7. The method of claim 1, wherein the information includes data from one or more sensors indicating that a user is actively manipulating the user device.

8. The method of claim 1, wherein the command includes the information about the user device and the one or more peer devices.

* * * * *